April 10, 1962 R. W. HOLMAN 3,029,373
MOTOR SPEED CONTROL SYSTEM
Original Filed June 23, 1955 2 Sheets-Sheet 1

INVENTOR
ROBERT W. HOLMAN
BY Donald G. Dalton
Attorney

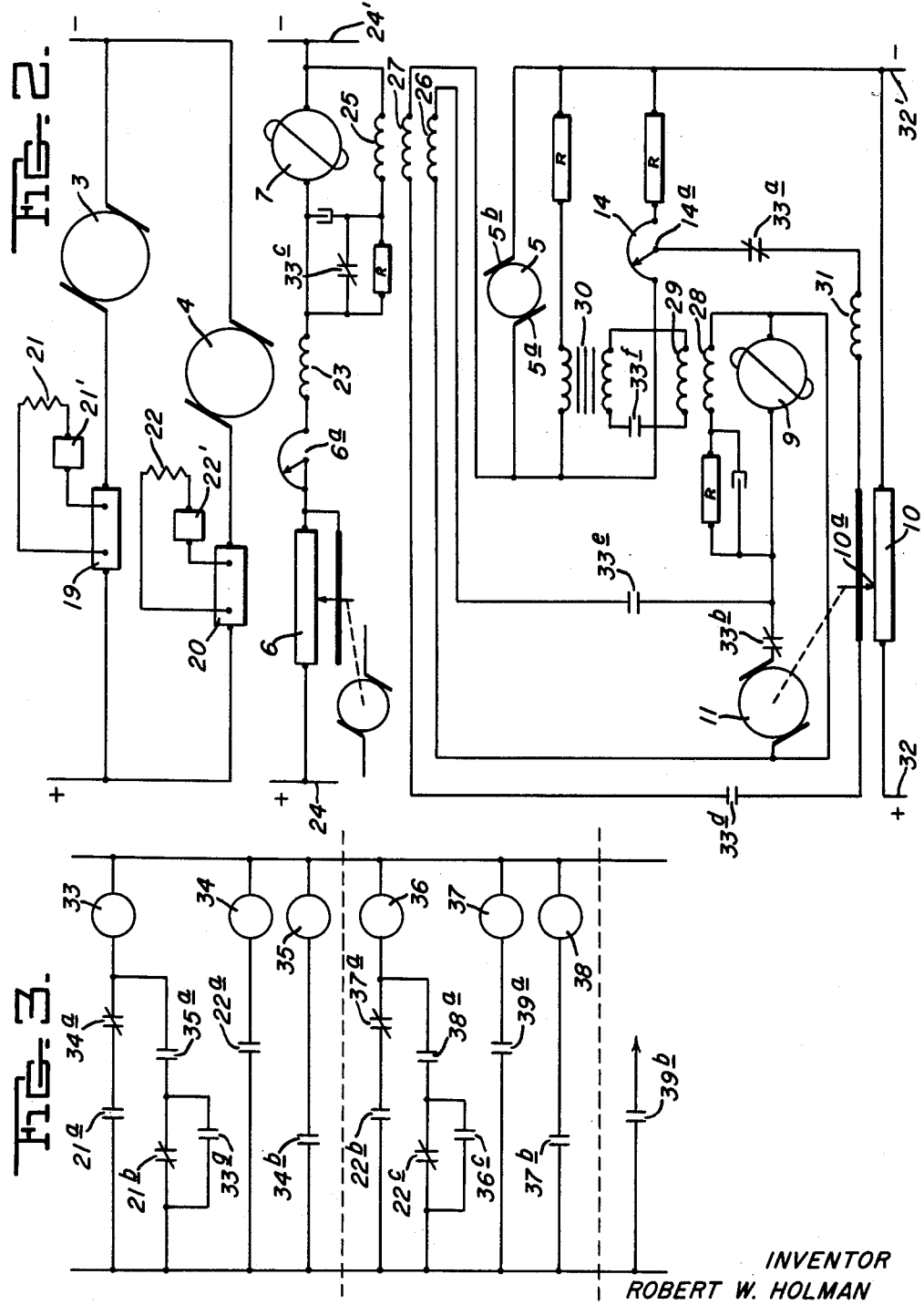

United States Patent Office 3,029,373
Patented Apr. 10, 1962

3,029,373
MOTOR SPEED CONTROL SYSTEM
Robert W. Holman, Birmingham, Ala., assignor to United States Steel Corporation, a corporation of New Jersey
Original application June 23, 1955, Ser. No. 517,504. Divided and this application May 3, 1960, Ser. No. 26,587
3 Claims. (Cl. 318—317)

This application which is a division of the co-pending application of Holman and McNamara, Serial No. 517,-504, filed June 23, 1955, relates to a motor speed control system and more particularly to such a system for controlling the speed of a rolling mill motor. Such motors have drooping speed characteristics. In the operation of a rolling mill in the manner specified in the above identified application it is necessary that the roll speed be changed rapidly and accurately.

It is therefore an object of my invention to provide an accurate, rapid and inexpensive system for controlling the speed of a motor.

These and other objects will be more apparent after referring to the following specification and attached drawings, in which:

FIGURE 2 is a circuit diagram showing the speed-control means of my invention which is provided for each of the motors of the second and succeeding stands; and FIGURE 3 is a schematic circuit showing the control relays for bringing the control means of FIGURE 2 into operation at the proper times.

Figure 1:
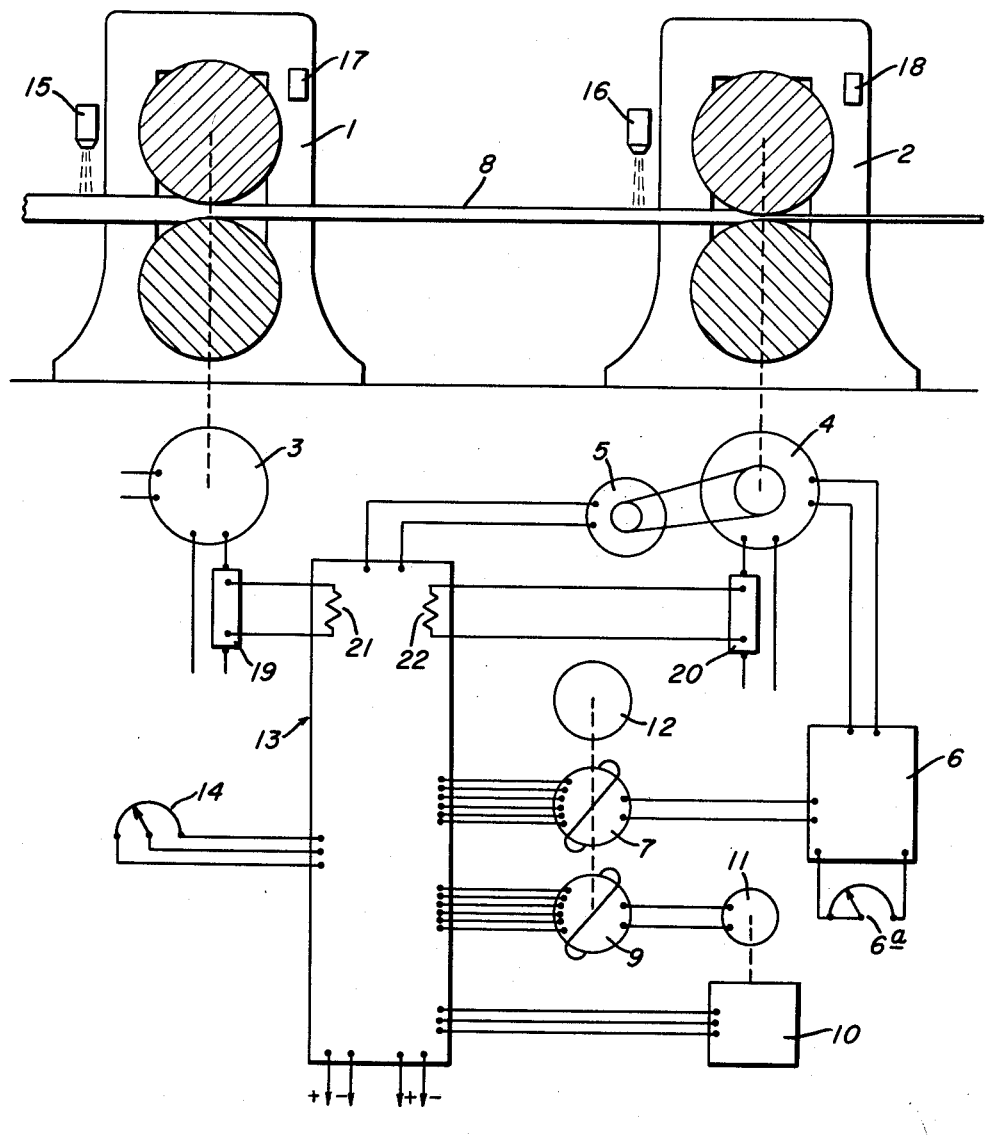
FIGURE 1 is a diagrammatic showing of the first two stands in the finishing train of a continuous hot-strip mill, the motors driving them and some of the auxiliary control devices.

Referring now in detail to the drawings, and for the present to FIGURE 1, mill stands 1 and 2 are driven by motors 3 and 4 respectively. These stands are the first two of, for example, a six-stand finishing train following a roughing train of four stands (not shown). A tachometer generator 5 is driven by motor 4. The speeds of motors 3 and 4 are manually controlled by motor-driven main field rheostats 6 and vernier rheostats 6a, only those for motor 4 being shown in FIGURE 1. Supplemental control of the excitation of motor 4 is effected by a regulator 7. The motor 4 normally operates at a speed somewhat greater than that of motor 3 because of the elongation of the breakdown 8 effected in stand 1, and the need to maintain the portion thereof between the stands under tension to aid the reduction. This tension is abnormally high when the leading end of the breakdown enters stand 2 running at no-load speed. The tension on this trailing end is relieved, however, the instant it leaves the stand 1, so far as the portion of the breakdown between stands 1 and 2 is concerned.

Motor-field regulator 7 is controlled by a speed-follower potentiometer 10 and tachometer generator 5. A speed-follower regulator 9 controls a motor 11 which drives potentiometer 10. Regulators 7 and 9 are "Amplidyne" generators driven by a motor 12. The circuits of the various control devices, as shown in detail in FIGURE 2, are completed through a control panel 13. A manual rheostat 14 is also connected thereto for adjusting the degree of the temporary change in motor speed necessary to prevent gage variation.

The signal of the entry of the leading end of a breakdown into a mill stand or the passage of the trailing end therethrough may be given by photo-cells 15 and 16 on the entry side of each stand, by load cells 17 and 18 mounted on the stands so as to be affected by the stretch thereof under load, or by shunts 19 and 20 responsive to the current drawn by motors 3 and 4. Whatever the source of the signal, it is amplified and supplied to a control relay associated with each stand, those for stands 1 and 2 being designated 21 and 22, after a suitable time delay introduced by any convenient means indicated at 21' and 22'.

FIGURE 2 shows the circuits of the speed-control system of my invention as applied to motor 4 indicated schematically in FIGURE 1. The motor of each succeeding stand is provided with the same speed-control system. Control of the speed of motor 4 is effected by varying the excitation of its field the winding of which, indicated at 23, is connected across an excitation bus 24, 24' in series with rheostat 6 and regulator 7. Regulator 7 has a differential field 25 which normally tends to reduce its terminal voltage, and acts to stabilize this voltage when excitation is maintained by a main or control field winding 27 adapted to be connected across generator 5 in series with potentiometer 10. Regulator 7 has a third field winding 26 adapted to be connected across regulator 9 in order to anticipate the speed levels to be controlled. Regulator 9 has a differential stabilizing field winding 28 and a speed-anticipating field winding 29 connected across the secondary of a transformer 30 the primary of which is connected across generator 5. Regulator 9 has a main or control field winding 31 connected across an excitation bus 32, 32' in series with potentiometer 10 and rheostat 14. Current-limiting resistors are indicated in FIGURE 2 by blocks labeled R. The resistance elements of the rheostats are similarly shown.

The speed-control system of FIGURE 2 is brought into play through the operation of relays 21 and 22 and auxiliary relays shown in FIGURE 3 which will be designated specifically during the following explanation of the operation. Before a breakdown, reduced from a starting slab by the roughing stands, enters stand 1, the speeds of all the mottors driving the finishing stands are adjusted to the proper values by operating rheostats 6, 6a and others similar thereto for each main drive motor such as 3 and 4. Rheostat 14 is also adjusted to effect a predetermined reduction in the speed of motor 4 as the breakdown enters stand 1. This reduction is brought about in a manner now to be explained.

When the mill is idling, motors 3 and 4 turn at their no-load speeds determined by the setting of rheostats 6 and generator 5 maintains a voltage across its terminals 5a, 5b depending on the speed of motor 4. A portion of the voltage across an excitation bus 32, 32' is applied across winding 31 by potentiometer 10 but that voltage is opposed by a portion of the voltage 5a, 5b, depending on the setting of rheostat 14. The voltage drop between contact finger 14a of rheostat 14, and terminal 5b is less than the voltage across terminals 5a and 5b, depending on the setting of rheostat 14. Any difference between the voltage drop from 14a to 5b and the drop from contact finger 10a of potentiometer 10 to 5b, will appear across winding 31, contact 33a of a relay 33 being normally closed. This voltage will cause regulator 9 to apply a voltage to motor 11, contact 33b of relay 33 being normally closed, in a direction such as to restore the balance between voltages 10a, 5b and 14a, 5b. Thus these voltages are kept balanced until the speed control is initiated.

As the breakdown enters stand 1, relay 21 is energized after the lapse of a definite time, completing a circuit for relay 33 at contact 21a (see FIGURE 3). This relay thereupon opens contacts 33a, 33b and 33c and closes contacts 33d, 33e and a contact 33f in the circuit of the secondary of transformer 30, initiating operation of the speed-control system to reduce the speed of motor 4. This results from the fact that the difference between voltages 5a, 5b and 10a, 5b appears across winding 27 whereupon regulator 7 adds an incremental voltage to increase the current through motor-field winding 23, decelerating the motor 4. The slowing down of motor 4 continues until voltage 5a, 5b is equal to the voltage 10a, 5b.

While the speed of motor 4 is changing, the voltage applied to the primary winding of transformer 30 by generator 5 also changes and this induces a voltage in the secondary winding which is applied to winding 29. The effect of the energization of winding 29 is applied by regulator 9 to winding 26 of regulator 7 in such direction as to prevent overshooting in the control of the speed of motor 4 by winding 27 of regulator 7 when relay 33 is energized.

Reduction of the speed of motor 4 is effected as explained above while the leading end of the breakdown is advancing from stand 1 to stand 2. On entering the latter the breakdown causes energization of relay 22 which closes a contact 22a, energizing a relay 34 (see FIGURE 3). Relay 34 opens a contact 34a in the circuit of relay 33, deenergizing the latter, whereupon it closes contacts 33a, 33b and 33c and opens 33d, 33e and 33f. This takes the supplemental speed-control means for motor 4 out of operation. Relay 34 also closes a contact 34b energizing a relay 35. Relay 22 also closes a contact 22b and brings into operation a similar speed-control means for the motor driving the third stand by energizing a relay 36 and so on up to the sixth and last stand. Timers 21' and 22', shown in FIGURE 2, are used to incorporate proper timing between the initiating signal and energization of relays 21 and 22 so that the controls can be initiated at the proper instant with respect to position of the leading or trailing end of a breakdown.

The motors driving the several stands are not only decelerated successively as the leading end of a breakdown approaches them but also are similarly decelerated as the trailing end leaves the preceding stand. After the initial speed adjustment, the motors return to their normal rolling speeds as determined by the settings of their rheostats 6 and 6a. When the trailing end of the breakdown leaves stand 1, relay 21 is deenergized, closing a contact 21b. A contact 35a having previously been closed by relay 35, relay 33 is again energized and closes its own sealing circuit at contact 33g.

The second energization of relay 33 again brings into operation the supplemental speed control means of my invention to reduce the speed of motor 4 slightly, increasing the tension between the second and third stands to compensate for the loss of tension between the first and second. When the trailing end of the breakdown leaves stand 2, relay 22 is deenergized, opening the circuit of relay 34 at contact 22a. Deenergization of relay 34 opens the circuit of relay 35 at contact 34b and deenergization of relay 35 opens contact 35a deenergizing relay 33. This restores all the control elements for motor 4 to starting conditions. Contacts 39a and 39b are those of a relay similar to relays 21 and 22, controlled by the entrance of the breakdown into the third stand. By this and other similar relays for the several stands, similar reductions of the speeds of the motors of stands three through five occur successively as the trailing end of the breakdown proceeds through the stands. No reduction of the speed of the sixth stand is necessary because no tension is possible after the strip leaves the fifth stand. The overall result, however, is that the system provides compensation for the loss of tension at each stand individually as the trailing end leaves it, plus the reflected loss of tension between the fifth and sixth stands.

While one embodiment of my invention has been shown and described, it will be apparent that other adaptations and modifications may be made without departing from the scope of the following claims.

1. In a motor-speed control system, a regulating generator in series with the motor-field winding, a tachometer generator driven by the motor, a manually operated potentiometer connected across said tachometer generator, a potentiometer controlling the field winding of said regulating generator, a motor driving said last-mentioned potentiometer, and a generator supplying current to the potentiometer-driving motor, the field winding of said last-mentioned generator being connected across the moving contacts of said potentiometers.

2. In a system as defined in claim 1 characterized by said last-mentioned potentiometer being connected across a constant-voltage source of excitation current for the field winding of said regulating generator.

3. In a motor-speed control system, a regulating generator in series with the motor-field winding, a tachometer generator driven by the motor, a manually operated potentiometer connected across said tachometer generator, a constant-voltage source of excitation current for the field winding of said regulating generator, a potentiometer connected across said source controlling said regulator-generator field winding, a motor driving said last-mentioned potentiometer, and a generator supplying current to said motor, the field winding of said last-mentioned generator being so connected as to be energized by the difference between the voltages applied by said potentiometers.

References Cited in the file of this patent
UNITED STATES PATENTS

| | | |
|---|---|---|
| 2,401,154 | Harris | May 28, 1946 |
| 2,830,249 | Peterson | Apr. 8, 1958 |